United States Patent
Boggs et al.

(10) Patent No.: US 6,792,079 B1
(45) Date of Patent: Sep. 14, 2004

(54) REMOTE ACCESS FOR CABLE LOCATOR SYSTEM

(75) Inventors: Patricia J. Boggs, Conyers, GA (US); John K. Boland, II, Dover, DE (US); Hossein Eslambolchi, Los Altos Hills, CA (US); John Sinclair Huffman, Conyers, GA (US); Robert K. McConkey, Bonifay, FL (US)

(73) Assignee: AT&T Corp., New York, NY (US)

( * ) Notice: Subject to any disclaimer, the term of this patent is extended or adjusted under 35 U.S.C. 154(b) by 170 days.

(21) Appl. No.: 10/245,664

(22) Filed: Sep. 17, 2002

(51) Int. Cl.$^7$ ............................................... H04M 1/24
(52) U.S. Cl. .......................... 379/9.05; 379/14; 379/12; 379/19; 379/22; 379/22.02
(58) Field of Search .................. 379/9.05, 14, 12, 379/19, 22, 22.02, 29.01; 324/326, 329, 331, 334, 337

(56) References Cited

U.S. PATENT DOCUMENTS

| | | | | |
|---|---|---|---|---|
| 5,509,065 A | * | 4/1996 | Fitzgerald | ................... 379/279 |
| 5,644,237 A | | 7/1997 | Eslambolchi et al. | |
| 5,689,546 A | * | 11/1997 | Sheets et al. | ............ 379/32.04 |
| 5,787,271 A | * | 7/1998 | Box et al. | ........................ 714/4 |
| 5,854,824 A | * | 12/1998 | Bengal et al. | ............ 379/32.04 |
| 5,896,217 A | * | 4/1999 | Ishikawa et al. | ............. 398/202 |
| 5,999,103 A | * | 12/1999 | Croslin | ................... 340/825.01 |
| 6,052,796 A | * | 4/2000 | Croslin | ........................... 714/4 |
| 6,215,888 B1 | * | 4/2001 | Eslambolchi et al. | ........ 382/100 |
| 6,240,373 B1 | | 5/2001 | Boggs et al. | |
| 6,353,320 B1 | * | 3/2002 | Eslambolchi et al. | ........ 324/326 |
| 6,356,082 B1 | * | 3/2002 | Alkire et al. | ................ 324/326 |
| 6,515,480 B1 | * | 2/2003 | Belew et al. | ................ 324/326 |

\* cited by examiner

*Primary Examiner*—Binh Tieu

(57) ABSTRACT

A system for transmitting operational control messages to a plurality of remotely-disposed cable-locating transmitters uses a spare communication line associated with each transmitter to carry the control messages from unit to unit. In the case of a fiber optic cable, the control message is transferred from an incoming telephone line associated with a first cable-locating transmitter to a spare optical fiber. The control message then propagates down the fiber to the next transmitter (where this transmitter does not otherwise have accessibility to a telephone line). This transmitter converts the optical signal to an electrical signal and either uses the control message (if indeed destined for that particular transmitter), or re-converts it to optical form and sends it further along the spare fiber to the next remote cable-locating transmitter further down the line.

9 Claims, 3 Drawing Sheets

REMOTE ACCESS FOR CABLE LOCATOR SYSTEM

TECHNICAL FIELD

The present invention relates to cable locating systems for buried utility company cables and, more particularly, to a system using spare communication lines in the conveyance to communicate with and control cable locating units at remote, inaccessible locations.

BACKGROUND OF THE INVENTION

Most utilities, such as those that provide electric, water, gas and telephone service, bury their conveyances (i.e., pipes and cables) underground—both for reasons of safety and esthetics. Underground burial also protects such conveyances from direct exposure to the elements. Once a utility buries a conveyance, the utility marks the location on a map (using, for example, a physical landmark such as a building, road, or bridge) to facilitate location of the conveyance in the event of a disruption of service along the line. Using a physical landmark as a point of reference incurs the disadvantage that such landmarks can, and do, undergo change. For example, a building may undergo renovation or even demolition whereas a road may be widened, thus altering the previously-existing physical relationship between the landmark and the buried conveyance. Consequently, relying on the physical relationship between a landmark and the conveyance may not always yield an accurate indication of the location of the conveyance.

To facilitate greater precision in the location of their conveyances, utilities often use electromagnetic detection techniques. One such locating technique is disclosed in U.S. Pat. No. 5,644,237, issued to H. Eslambolchi et al. on Jul. 1, 1997. Eslambolchi et al. describe and claim a locating technique, whereby a first transmitter impresses a first locating tone on a conveyance to allow a technician to generally locate the conveyance using a signal-locating receiver. Additionally, a second transmitter may be used to provide a coded, near-DC signal on the conveyance to allow the technician, using a second receiver, to precisely locate the conveyance of interest.

Service providers, such as AT&T, often utilize a large number of transmitters for providing cable-locating tones on their buried conveyances. Often, the transmitters are located at remote, unmanned facilities, requiring that a technician travel to such a facility to service the cable-locating transmitter. Such servicing may include, for example, upgrading the software used in the transmitter, turning "on" or "off" the transmitter, changing the specific cable-locating frequency used for that conveyance, etc. One prior art technique to improve the efficiency of controlling a group of remote cable-locating transmitters is disclosed in U.S. Pat. No. 6,240,373 issued to P.J. Boggs et al. on May 29, 2001. In the Boggs et al. arrangement, a centrally-disposed control unit includes a database and communication lines linked to each of the remote transmitters. Simultaneous software upgrades to a group of remote cable-locating transmitters can then be simply controlled from the central location, with the upgrades transmitted over a dedicated telephone line to each remote facility.

In some remote areas, however, there are no telephone lines available to provide for an interconnection between a cable-locating transmitter and a central controller. In these instances, therefore, it is necessary to have a technician travel to the remote location and manually operate the system to perform the necessary software upgrade or perform modification(s) in tone frequency, power, "on" or "off" status, and the like. In today's environment where productivity must be increased, a new system is needed to control the cable-locating transmitters at locations without telephone service.

SUMMARY OF THE INVENTION

The need remaining in the prior art is addressed by the present invention, which relates to cable locating systems for buried utility company cables and, more particularly, to a system using spare communication lines in the actual conveyance to communicate with and control cable locating units at remote, inaccessible locations.

In accordance with the present invention, a first cable-locating transmitter unit with access to a telephone line is used as a "control unit" to pass control signals along to other cable-locating transmitters without telephone access. A spare communication line (for example, a pair of spare fibers in a fiber optic cable conveyance) in the control unit is coupled to a conventional device used to control the operation of a cable-locating transmitter. This spare line is then subsequently coupled to a remotely-disposed cable-locating transmitter, which in turn couples the spare line to another remotely-disposed cable-locating transmitter, and so on, until a group of transmitters are coupled to a telephone-connected control unit through the spare communication line. In the case of a fiber optic cable conveyance where the spare line is a pair of optical fibers, additional opto-to-electronic conversion apparatus is required at each remotely-disposed cable-locating transmitter.

In operation, therefore, control messages may be sent (using DTMF tone sequences, for example) over the telephone line to the "control" cable-locating transmitter. The control signals will include the particular address of the cable-locating transmitter that needs to be modified. Each transmitter will, in turn, receive the message, and if the address is for that particular transmitter, will proceed to perform the necessary modifications. If the address does not match the current transmitter, the message will be sent on down the line to the next transmitter, where the process will be repeated until the desired cable-locating transmitter is reached and the modification performed.

In a preferred embodiment of the present invention, a return signal path is used to carry a confirmation signal to allow the technician to know that the command has reached the proper unit and the modification has been performed.

Other and further embodiments and aspects of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
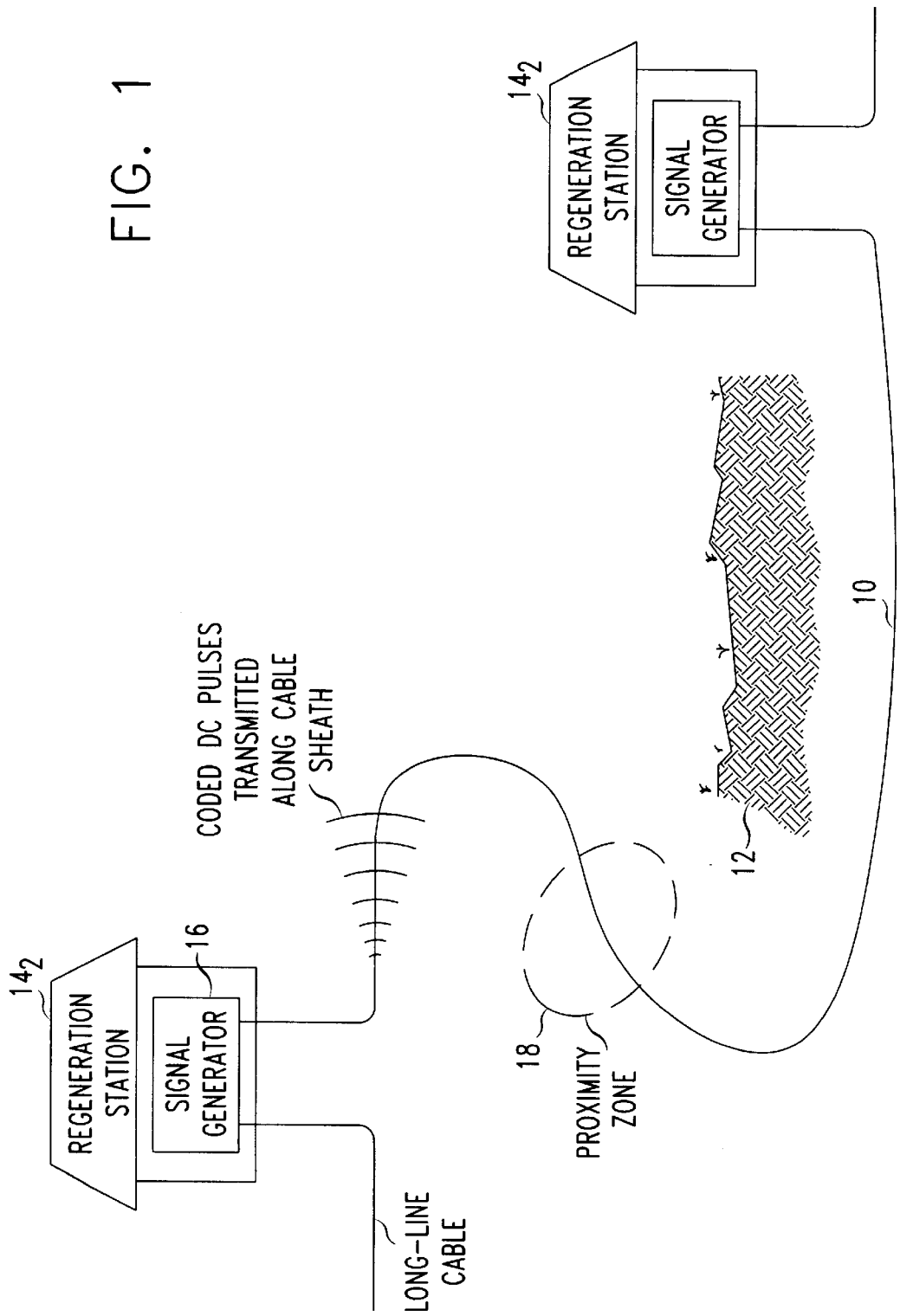
FIG. 1 illustrates an exemplary communication arrangement with a buried conveyance disposed between a pair of cable-locating transmitters.

FIG. 1 illustrates an exemplary utility conveyance 10 that is buried below the earth 12 to a depth of several feet. In this particular embodiment, conveyance 10 comprises a cable that carries telecommunications traffic, either within a local exchange or between two such exchanges. Depending on the nature of conveyance 10, and its overall length, it may be necessary to regenerate (i.e., boost) the strength of the signals carried by the cable at spaced intervals along its length. For that reason, cable 10 is illustrated as running between a pair of regeneration stations $14_1$ and $14_2$ that boost the strength of the signals carried by cable 10.

Occasionally, excavation must occur along the right-of-way of cable 10. As mentioned above, cable-locating tone generators, such as transmitter 16 of FIG. 1, are used to generate both a cable-locating tone and a cable-confirmation tone to facilitate location of the cable. Each transmitter 16 typically comprises a model LMS 3 signal generator manufactured by Radiodetection Ltd. of the United Kingdom for simultaneously impressing both the cable-locating tone and the cable-confirmation tone on that length of cable extending to the next regenerator station.

The cable-locating tone comprises an RF signal at a frequency specific to the utility maintaining cable 10. For example, AT&T (which maintains a large number of underground telecommunication cables) has at least one specific cable-locating frequency assigned to it. Other utilities, such as those providing electric, water and/or gas, similarly have specifically-assigned locating frequencies. The cable-locating tone is generally of a frequency, and of a power level sufficient to generate a field that radiates at least within a proximity zone 18 of a radius greater than the depth to which cable 10 is buried below the earth 12. In this way, the cable-locating tone can be detected above ground.

Figure 2:
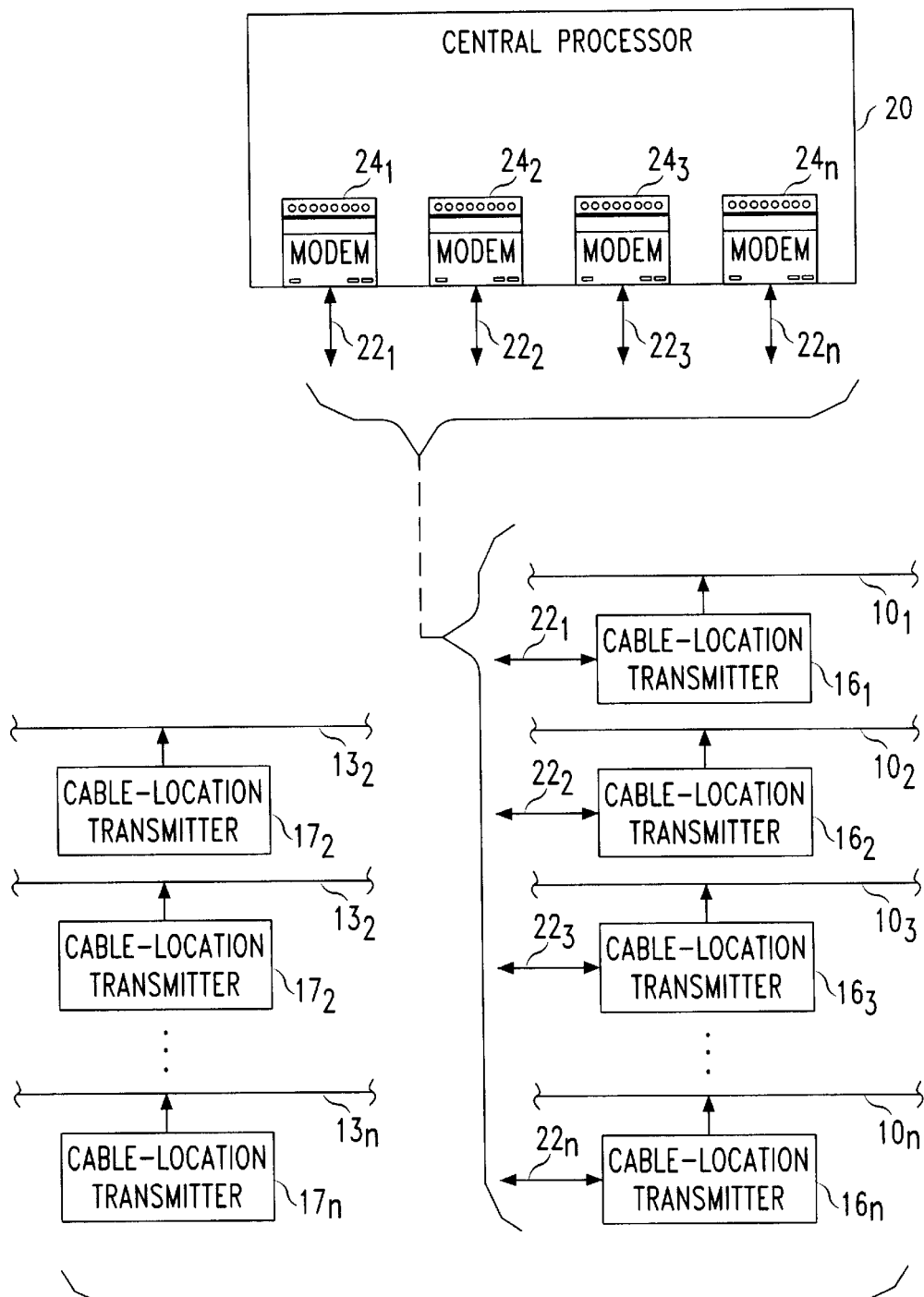
FIG. 2 contains a diagram illustrating a plurality of cable-locating transmitters, with a first group including telephone communication for interacting with a central control unit and a second group without such telephone communication ability.

As long as each transmitter 16 is accessible, its operating conditions (i.e., assigned cable-locating frequency, power, "on"/"off" state, etc.) can be modified as needed. As mentioned above, many of these generators are computer-controlled and are remotely located with respect to one another. It can often be extremely time-consuming and costly to visit each generator individually to perform the necessary modifications. FIG. 2 illustrates a prior art arrangement that addresses this problem by utilizing a central processor 20 and telecommunication lines 22 to interact with a plurality of transmitters 16. As shown, each transmitter $16_i$ includes a telephone interconnection $22_i$ that is in communication with central processor 20 through an associated modem $24_i$. Central processor 20 includes the necessary software and hardware to either interact with a specific transmitter $16_i$, or "broadcast" information (such as a software upgrade) to all of the transmitters. However, in order to achieve this capability, there needs to be separate telecommunication access to each transmitter 16, where this is not always available. Indeed, FIG. 2 illustrates a second set group of transmitters 17 and associated cable conveyances 13, where transmitters 17 lack any telecommunication capability. Thus, in the prior art, there still remains the need for a technician to physically visit all such remotely-disposed cable-locating transmitters without telecommunication capabilities to perform system upgrades or modify the operating parameters of the transmitter.

Figure 3:
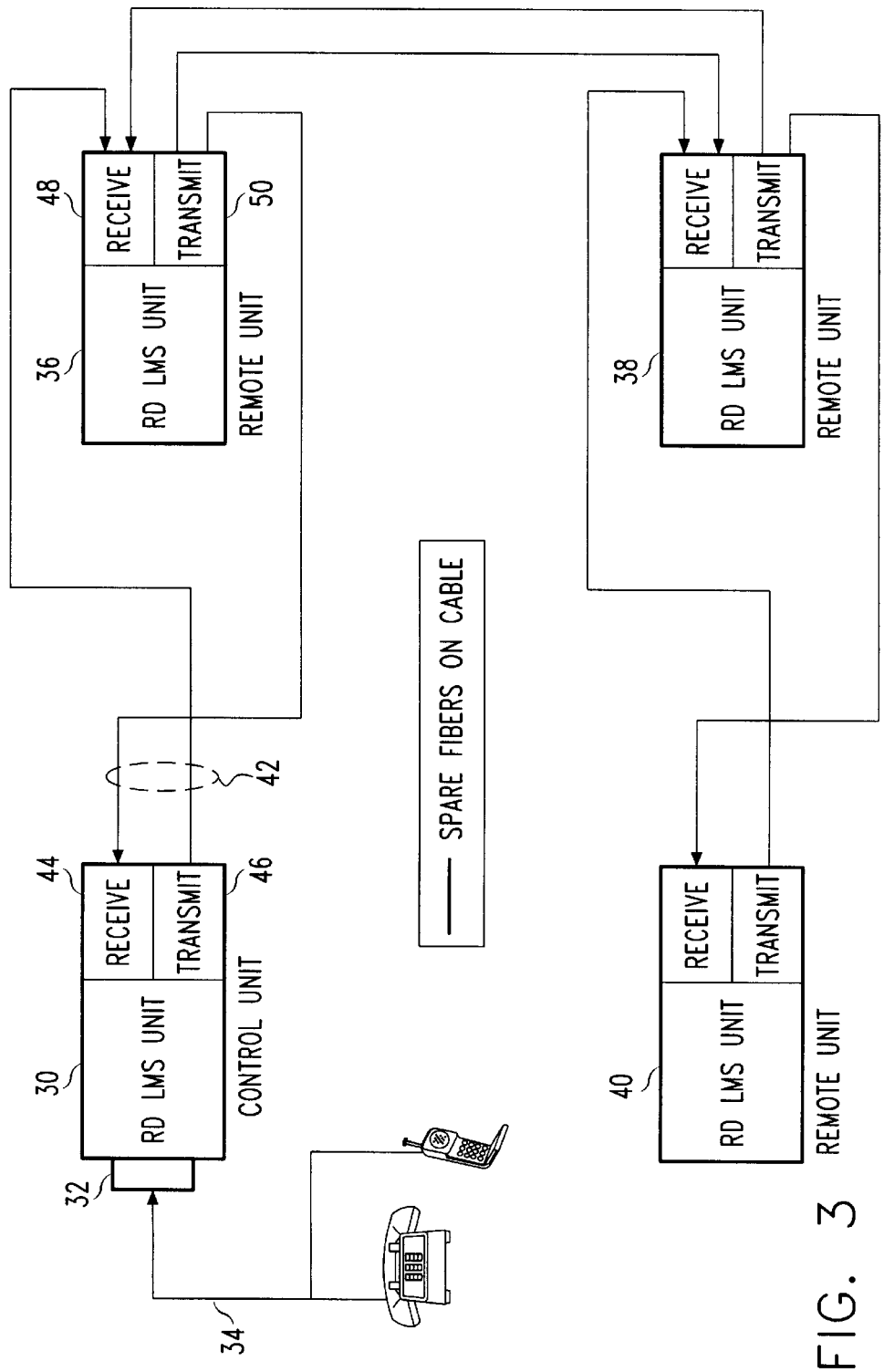
FIG. 3 illustrates a preferred embodiment of the present invention, showing the utilization of a spare communication path to provide a communication link between a cable-locating transmitter with telephone communication and a plurality of transmitters without such telecommunication ability.

The arrangement of the present invention, as illustrated in FIG. 3, overcomes this limitation by using a spare communication line available in the conveyance (such as cable 10) to provide a communication link between a first, control cable-locating transmitter (i.e., a transmitter with telecommunication capability) and a plurality of remotely-disposed cable-locating transmitters without telecommunication capability. In particular, FIG. 3 illustrates a first, control cable-locating transmitter 30 that includes a modem 32 for providing telecommunication capability between a technician and transmitter 30 over an incoming telephone line 34 (such as a traditional POTS line, or as available with a cellular connection). In a conventional manner and as described above, telephone line 34 is used to gain access to transmitter 30 so as to perform modifications or updates to the performance of transmitter 30. Such modifications can include changing the cable-locating frequency associated with transmitter 30, changing the power level of the cable locating tone, etc. As is known in the art, dual-tone multi-frequency (DTMF) signals from a telephone keypad are used to control these various functions, where transmitter 30 includes a processor that recognizes various tone sequences and responds accordingly. Moreover, a particular tone sequence (defined as a "message") can be used as a security measure to block access to transmitter 30 by unauthorized personnel. In the particular case where cable 10 is a fiber optic cable, the locating tone generated by transmitter 30 is applied as a signal to the metallic sheath surround the cable (such as shown in FIG. 1) so that a technician using a locating unit can easily determine the physical location of cable 10.

In accordance with the present invention, the capability of using DTMF-based message signals to modify the operation of cable locating tone transmitters without telephone interconnection is accomplished by using a spare communication line in cable 10 to transmit the DTMF signals from one transmitter to another. Referring to FIG. 3, it is presumed that remotely-disposed transmitters 36, 38 and 40 do not have telecommunication capability. Thus, a spare communication line 42 within cable 10 is used to provide the communication capability required to modify the parameters of transmitters 36, 38 or 40 without the need to physically visit each transmitter. In particular, transmitter 30 includes a receive unit 44 that is disposed to receive the incoming DTMF signals from telephone line 34. Receive unit 44 first looks at the "transmitter address" included in the DTMF message to determine if the command is for transmitter 30 or another cable-locating transmitter. If the message is for transmitter 30, the appropriate modification is made (e.g., change the frequency of the cable-locating tone propagating along the cable sheath), and a "confirmation" message may be sent back over telephone line 34 to the technician. If the transmitter address is associated with another cable-locating transmitter, receive unit 44 will pass the message along to transmit unit 46, which then propagates the message over spare communication line 42 to remote transmitter 36. In the case that cable 10 is a fiber optic cable and the spare communication line comprises a pair of spare optical fibers, receive unit 44 must comprise the components required to convert a received optical signal into the equivalent electrical representation of the DTMF tone sequences (using, for example, a photodiode) and, similarly, the electrical signal version of the DTMF signals needs to be re-converted into an optical signal (using, for example, a laser or LED) in transmit unit 46 before being coupled onto communication line 42.

Remotely-disposed transmitter 36 will first encounter the DTMF control message in its receive unit 48, which will also perform an optical to electrical conversion, if necessary.

As with receive unit 44 in transmitter 30, receive unit 48 in transmitter 36 will first analyze the "transmitter address" in the message and determine if the command is to be performed on local transmitter 36. If so, the modification to the tone generation function will be performed (e.g., change frequency, change power, etc), and a confirmation signal may be sent back, also via communication line 42, through receive unit 44 of transmitter 30 and onto telephone line 34 to the technician. Again, if the address is not associated with remote transmitter 36, a transmit unit 50 in transmitter 36 will re-convert the message into an optical signal and couple the signal onto the section of communication line 42 between remote transmitter 36 and remote transmitter 38. Remote transmitter 38, as well as remote transmitter 40, each include similar receive and transmit units to process the information in the DTMF signal message and respond accordingly.

Therefore, in accordance with the present invention, spare communication line 42 may be used to provide DTMF-controlled access to cable-locating tone transmitters that are not directly accessible by telecommunication lines. This is considered to be a significant cost savings when compared to installing separate telephone lines to each transmitter for the sole purpose of allowing access and control of the transmitter, or sending a technician to manually adjust the performance of such remote cable-locating tone transmitters.

The above-described embodiments merely illustrate the principles of the present invention. Those skilled in the art may make various modifications and changes that will embody the principles of the invention and still fall within the spirit and scope thereof.

What is claimed is:

1. A system for controlling the operation of a plurality of remotely-disposed cable-locating transmitters associated with buried cable of a communication conveyance, wherein said plurality of remotely-disposed cable-locating transmitters lack telecommunication capability, the system comprising
   a spare communication line coupled between a first, control transmitter with telecommunication capability and said plurality of remotely-disposed cable-locating transmitters, the spare communication line coupled in series between the first, control transmitter through the plurality of remotely-disposed cable-locating transmitters;
   a receive unit in each transmitter coupled to the spare communication line; and
   a transmit unit in each transmitter coupled to the spare communication line, the combination of the receive units and transmit units used to transmit operating control messages from the first, control transmitter to predetermined ones of the remotely-disposed cable-locating transmitters.

2. The system as defined in claim 1 wherein the system is used with a buried fiber optic cable and the spare communication line comprises a pair of spare optical fibers within said cable.

3. The system as defined in claim 2 wherein each receive unit comprises an optical-to-electrical converter for changing received optical control messages from said pair of spare optical fibers into electrical control messages.

4. The system as defined in claim 2 wherein each transmit unit comprises an electrical-to-optical converter for changing received electrical control messages into optical control messages for transmission along the pair of spare optical fibers.

5. The system as defined in claim 1 wherein the operating control messages include transmitter address information that is unique for each remotely-disposed cable-locating transmitters in the plurality of remotely-disposed cable-locating transmitters.

6. The system as defined in claim 1 wherein the operating control messages include commands selected from a list including turning "on" a transmitter, turning "off" a transmitter, changing the frequency of the cable-locating tone, changing the power of the cable-locating tone.

7. A method of transmitting operation control messages to at least one remotely-disposed cable-locating transmitters that lack telecommunication capability, the method comprising the steps of:
   providing a first, control cable-locating tone transmitter including telecommunication capability;
   defining a spare communication line existing between said first, control cable locating tone transmitter and a second, remotely disposed cable-locating transmitter; and
   transmitting operation control messages across said spare communication line between said first and second transmitters.

8. The method as defined in claim 7 wherein the at least one remotely-disposed cable-locating transmitter comprises a plurality of remotely-disposed cable-locating transmitters and the method comprises the further steps of:
   defining, in sequence, a spare communication line between each adjoining remotely-disposed cable-locating transmitter; and
   transmitting operation control messages from the first, control cable-locating tone transmitter through the plurality of remotely-disposed cable-locating transmitters.

9. The method as defined in claim 8 wherein each operation control message includes transmitter address information identifying the particular transmitter in the plurality of remotely-disposed cable-locating transmitters that is predetermined to receive and use the operation control information.

* * * * *